US 7,630,969 B2

United States Patent
Ritter (10) Patent No.: US 7,630,969 B2
(45) Date of Patent: Dec. 8, 2009

(54) INDEXING AND SEARCHING FOR DATABASE RECORDS WITH DEFINED VALIDITY INTERVALS

(75) Inventor: Gerd M. Ritter, Heidelberg (DE)

(73) Assignee: Sap AG, Walldorf (DE)

( * ) Notice: Subject to any disclaimer, the term of this patent is extended or adjusted under 35 U.S.C. 154(b) by 312 days.

(21) Appl. No.: 11/510,222

(22) Filed: Aug. 25, 2006

(65) Prior Publication Data

US 2008/0065598 A1    Mar. 13, 2008

(51) Int. Cl.
*G06F 7/00* (2006.01)
*G06F 17/30* (2006.01)

(52) U.S. Cl. .............................. 707/3; 707/4; 707/102; 707/203

(58) Field of Classification Search .................. None
See application file for complete search history.

(56) References Cited

U.S. PATENT DOCUMENTS

| | | | | |
|---|---|---|---|---|
| 4,118,788 A | * | 10/1978 | Roberts ........................... | 707/3 |
| 5,440,730 A | * | 8/1995 | Elmasri et al. ............... | 707/203 |
| 5,950,210 A | | 9/1999 | Nelson | |
| 6,061,678 A | | 5/2000 | Klein et al. ..................... | 707/3 |
| 6,237,001 B1 | | 5/2001 | Bamford et al. ............. | 707/100 |
| 6,338,056 B1 | | 1/2002 | Dessloch et al. ............... | 707/2 |
| 6,421,667 B1 | | 7/2002 | Codd et al. | |
| 6,578,037 B1 | | 6/2003 | Wong et al. ................... | 707/10 |
| 6,772,172 B2 | | 8/2004 | Leong et al. ................ | 707/103 |
| 2007/0050400 A1 | | 3/2007 | Durbin | |

* cited by examiner

*Primary Examiner*—Greta L Robinson
*Assistant Examiner*—James J Wilcox
(74) *Attorney, Agent, or Firm*—Mintz, Levin, Cohn, Ferris, Glovsky & Popeo, P.C.

(57) ABSTRACT

A computer-implemented method of indexing an electronic database record to facilitate searching is provided, as well as a method of performing a search using the index. The method includes receiving a value for one of a start field and an end field for a database record that defines a validity range for a property. The method further includes assigning a corresponding one of multiple defined index values for the received value. There is a different index value defined for each of multiple defined consecutive ranges for the property. The assigned index value corresponds to a one of the multiple defined consecutive ranges within which the received value falls. The method also includes storing the assigned index value in association with the database record in a manner that is searchable.

18 Claims, 9 Drawing Sheets

| Interval \N | 1 | 2 | 3 | 4 | 5 |
|---|---|---|---|---|---|
| 0  | 0 | 00  | 000     | 0000          | 00000 |
| 1  | * | 0*  | 00*     | 000*          | 0000* |
| 2  |   | 0* 10 | 00* 010 | 000* 0010   | 0000* 00010 |
| 3  |   | *   | 0*      | 00*           | 000* |
| 4  |   |     | 0* 100  | 00* 0100      | 000* 00100 |
| 5  |   |     | 0* 10*  | 00* 010*      | 000* 0010* |
| 6  |   |     | 0* 10* 110 | 00* 010* 0110 | 000* 0010* 00110 |
| 7  |   |     | *       | 0*            | 00* |
| 8  |   |     |         | 0* 1000       | 00* 01000 |
| 9  |   |     |         | 0* 100*       | 00* 0100* |
| 10 |   |     |         | 0* 100* 1010  | 00* 0100* 01010 |
| 11 |   |     |         | 0* 10*        | 00* 010* |
| 12 |   |     |         | 0* 10* 1100   | 00* 010* 01100 |
| 13 |   |     |         | 0* 10* 110*   | 00* 010* 0110* |
| 14 |   |     |         | 0* 10* 110* 1110 | 00* 010* 0110* 01110 |
| 15 |   |     |         | *             | 0* |
| 16 |   |     |         |               | 0* 10000 |
| 17 |   |     |         |               | 0* 1000* |
| 18 |   |     |         |               | 0* 1000* 10010 |
| 19 |   |     |         |               | 0* 100* |
| 20 |   |     |         |               | 0* 100* 10100 |
| 21 |   |     |         |               | 0* 100* 1010* |
| 22 |   |     |         |               | 0* 100* 1010* 10110 |
| 23 |   |     |         |               | 0* 10* |
| 24 |   |     |         |               | 0* 10* 11000 |
| 25 |   |     |         |               | 0* 10* 1100* |
| 26 |   |     |         |               | 0* 10* 1100* 11010 |
| 27 |   |     |         |               | 0* 10* 110* |
| 28 |   |     |         |               | 0* 10* 110* 11100 |
| 29 |   |     |         |               | 0* 10* 110* 1110* |
| 30 |   |     |         |               | 0* 10* 110* 1110* 11110 |
| 31 |   |     |         |               | * |

FIG. 1

Car Rental Contracts

| Record | ... | Valid_From (Pick Up Date) | Valid_To (Return Date) |
|---|---|---|---|
| Contract_001 | | 20030131 | 20030206 |
| Contract_002 | | 20050315 | 20050327 |
| Contract_003 | | 20040614 | 20040709 |
| ⋮ | ⋮ | ⋮ | ⋮ |

| Interval \N | 1 | 2 | 3 | 4 | 5 |
|---|---|---|---|---|---|
| 0 | 0 | 00 | 000 | 0000 | 00000 |
| 1 | * | 0* | 00* | 000* | 0000* |
| 2 | | 0* 10 | 00* 010 | 000* 0010 | 0000* 00010 |
| 3 | | * | 0* | 00* | 000* |
| 4 | | | 0* 100 | 00* 0100 | 000* 00100 |
| 5 | | | 0* 10* | 00* 010* | 000* 0010* |
| 6 | | | 0* 10* 110 | 00* 010* 0110 | 000* 0010* 00110 |
| 7 | | | * | 0* | 00* |
| 8 | | | | 0* 1000 | 00* 01000 |
| 9 | | | | 0* 100* | 00* 0100* |
| 10 | | | | 0* 100* 1010 | 00* 0100* 01010 |
| 11 | | | | 0* 10* | 00* 010* |
| 12 | | | | 0* 10* 1100 | 00* 010* 01100 |
| 13 | | | | 0* 10* 110* | 00* 010* 0110* |
| 14 | | | | 0* 10* 110* 1110 | 00* 010* 0110* 01110 |
| 15 | | | | * | 0* |
| 16 | | | | | 0* 10000 |
| 17 | | | | | 0* 1000* |
| 18 | | | | | 0* 1000* 10010 |
| 19 | | | | | 0* 100* |
| 20 | | | | | 0* 100* 10100 |
| 21 | | | | | 0* 100* 1010* |
| 22 | | | | | 0* 100* 1010* 10110 |
| 23 | | | | | 0* 10* |
| 24 | | | | | 0* 10* 11000 |
| 25 | | | | | 0* 10* 1100* |
| 26 | | | | | 0* 10* 1100* 11010 |
| 27 | | | | | 0* 10* 110* |
| 28 | | | | | 0* 10* 110* 11100 |
| 29 | | | | | 0* 10* 110* 1110* |
| 30 | | | | | 0* 10* 110* 1110* 11110 |
| 31 | | | | | * |

FIG. 2C

DESIGN-TIME PROCESS

INDEXING AND SEARCHING FOR DATABASE RECORDS WITH DEFINED VALIDITY INTERVALS

TECHNICAL FIELD

This document relates to electronic databases with records that have a defined validity interval, and more particularly to techniques for indexing the records and using the index in searching so as to reduce the time it takes for searches to be performed.

BACKGROUND

There are many scenarios where database records each have a defined validity interval. The validity interval may be defined by a start attribute and an end attribute for the interval. Some example of database records that may have defined validity intervals are car rental contracts with the corresponding rental period (pick up of the car until the car's return), insurance contracts with the corresponding validity period during which the insurance contract is in force, and materials having a minimal and maximum recommended load capacity. In some cases, the validity interval may not be fixed. For is example, the interval may be a day to several months.

It is often needed to be able to search database records to retrieve or identify the records whose validity interval satisfies a specified condition. For example, it may be needed to identify all records that have the interval covering one value, for example, the contracts that are valid on a particular date. Another example is that it may be needed to identify all records that have an overlap or some other kind of intersection with a search interval defined by a person performing a database search, for example, all contracts that are valid at least one day between February 1 and February 3.

In a typical case of database searching that involves such a condition, two inequality conditions may need to be used in a scan of an index to identify the records that satisfy the condition. For example, a first search may be to determine records that have a start date that is on or before February 3, and a second search would then be conducted to determine records that have an end date that is on or after February 1. In many databases, two inequality conditions cannot be included in the same scan the way equality conditions can be included in the same scan. As such, the first inequality condition would be used in a first scan of the entire index to identify all database records for which the first inequality condition is met. Then, the second inequality condition would be used in a second scan of only those records for which the first scan identified records. In many cases the same record will need to be scanned twice in order to be eliminated from consideration.

Database search performance—the time it takes for such a search to be conducted—may work with sufficient performance if the search is being conducted at one end of the entire range within which a valid interval may be defined. For example, if the validity range is a time period, and the range being searched falls at the more recent end of the spectrum, the first inequality scan may identify only a very few records, and so the second inequality scan would only need to be run on a few records. On the other hand, where the validity period falls in the middle of the overall range, search performance may be degraded by multiple inequality scans being performed on the same record, where the second scan eliminates many records that the first scan could not eliminate.

SUMMARY

This document describes relates to electronic databases with records that have a defined validity interval, and more particularly to techniques for indexing the records and using the index in searching so as to reduce the time it takes for searches to be performed.

In one aspect, a computer-implemented method of indexing an electronic database record to facilitate searching is provided. The method includes receiving a value for one of a start field and an end field for a database record that defines a validity range for a property. The method further includes assigning a corresponding one of multiple defined index values for the received value. There is a different index value defined for each of multiple defined consecutive ranges for the property. The assigned index value corresponds to a one of the multiple defined consecutive ranges within which the received value falls. The method also includes storing the assigned index value in association with the database record in a manner that is searchable.

In various implementations, the method may include one or more of the following features. The property may be a time property, or any other property that has a continuum of possible values. Each different index value defined for each of the multiple defined consecutive ranges may be a different binary code.

In another aspect, there is provided a computer-implemented method of performing an electronic database search. The method includes receiving a request to identify database records that satisfy a specified condition. The records are of a type that has, for a property, a defined validity range bounded by a value for a first attribute and a value for a second attribute. The specified condition is of a type that is satisfied for a record when for a record both a first inequality condition on the first attribute value and a second inequality condition on the second attribute value are satisfied. The method also includes executing a scan of an index for the database records. The index includes, for each of the records, the first attribute value for the record and an encoded value of the second attribute value for the record. The encoded value is one of multiple unique digital values for each of multiple consecutive ranges for the property within which the second attribute falls. The scan identifies records for which both the inequality condition on the first attribute value and an equality condition on the encoded value for the second attribute value are satisfied.

In various implementations, the method includes one or more of following features. The property may be a time property or a property that has a continuum of possible values. Each different index value defined for each of the multiple defined consecutive ranges may be a different binary code.

The equality condition on the encoded value for the second attribute may filter all records for which no value within the range corresponding to the encoded value would satisfy the inequality condition on the second attribute. The method may further comprise executing a second scan of the index of the records. The second scan may identify, from among the records identified in the scan using the inequality condition on the first attribute values and the inequality condition on the encoded values for the second attribute values, records for which the inequality condition on the second attribute values is also satisfied.

The second attribute, which is the attribute that is encoded, may be a start value field of database records, and the equality condition may be a condition wherein the encoded value for the second attribute value for a record equals either the digital value corresponding to the latest of the ranges for the property wherein the specified condition is satisfied or the digital value corresponding to any earlier ones of the ranges. In such a case, the first attribute, which is not encoded, may be an end value field, and the inequality condition may be a condition wherein the value for the end value field for a record is before a value for the property that permits the specified condition to possibly be met.

Alternatively, the second attribute, which is the attribute that is encoded, may be an end value field of database records, and the equality condition is a condition wherein the encoded value for the second attribute value for a record equals either the digital value corresponding to the earliest of the ranges for the property wherein the specified condition is satisfied or the digital value corresponding to any earlier ones of the ranges. In this case, the first attribute, which is not encoded, may be a start value field, and the inequality condition may be a condition wherein the value for the start value field for a record is after a value for the property that permits the specified condition to possibly be met.

In other aspects, systems and computer program products are provided for executing the above described methods. The computer program products may include executable program instructions that when executed by a processor perform operations for carrying out the above described methods.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
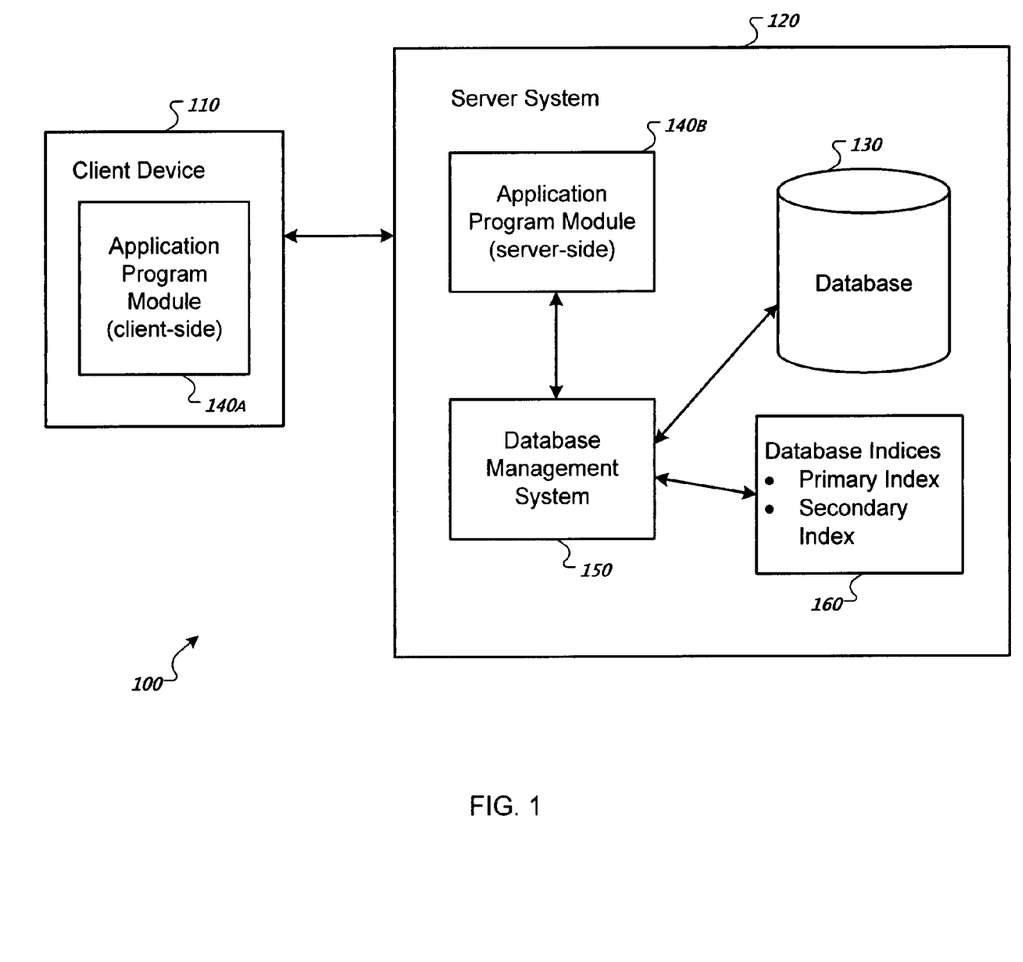
FIG. 1 is a block diagram of a computing system including a database, in which system database indexing and search techniques described in this document may be implemented.

A networked computing system 100, shown in FIG. 1, is an example of a system that makes use of an electronic database and in which various techniques described in this document may be used. The system 100 in this example follows a client-server type of architecture, and includes a client device 110 (although only one such device is shown, it will be appreciated that there may be many such devices) that communicates with a server system 120. A user interacting with the client device 110 is able to interact with the server system 120, and accordingly with an electronic database 130 included in the server system 120.

The database 130 includes electronically stored database records. The database 130 may be, for example, a relational database or an object-oriented database. Individual records are created, or instantiated, from a database record type definition, such that the newly created records include various fields as defined by the record type definition. In relational databases, for example, a table structure may define the various database fields that each record being a member of the record type includes. Rows of a relational database table may represent individual database records, and columns of the table may represent the database fields. Each database field may be assigned a value for the field when a database record is created, or when the record is revised. In object-oriented databases, an object class structure may define the fields, called attributes, that each record, called an object, being a member of the object class includes. The terms "record," "record type," and "field" are used in this document as generic terminology, and are intended to describe, for example, at least relational databases and object-oriented databases.

In the FIG. 1 example, there is an application program having both a client-side component 140A that resides within the client device 110 and a server-side component 140B that resides within the server system 120. In other examples, the application program may reside solely on a client device, solely on a server system, or on multiple server systems. The server system 120, in this example, also includes a database management system 150 that serves as the interface between the application program 140A and 140B and the database 130. A database index 160, which in this example resides within the server system 120, includes electronically stored information about database records stored in the database 130. The database index 160 is used in user-initiated searches that are executed to identify database records stored in the database 130 that meet various search criteria defined by a user using, for example, the application program 140A and 140B.

In the FIG. 1 example, the database index 160 includes both a primary index and a secondary index. The primary index may be a collection of certain database fields. It is a unique of the data records in the database table, which guarantees the uniqueness of the records. Furthermore, this index can be also used for data retrieval or queries. The secondary index may be a collection of certain database fields where, during database design where fields to be included in the index are defined, it was determined that the fields so included may be useful in searching for relevant database records. The secondary index can be defined completely independent from the primary index by using arbitrary fields of the database table. Alternatively or in addition, the secondary index may include information derived from certain fields included in the primary index. The secondary index information may be formatted in a manner that allows the secondary index to be used in various predefined database record search queries.

The techniques described in this document apply to databases that have a certain type of record structure and where a certain type of search on those records is desired. One example record structure is where a database includes records, or documents, where each record has an interval, or range, defined by a start value and an end value. In some cases where the interval defines an interval over which a record is valid, this interval may be referred to as a validity interval, or validity range, with the start value being a "valid_from" value and the end value being a "valid_to" value.

Figure 2A:
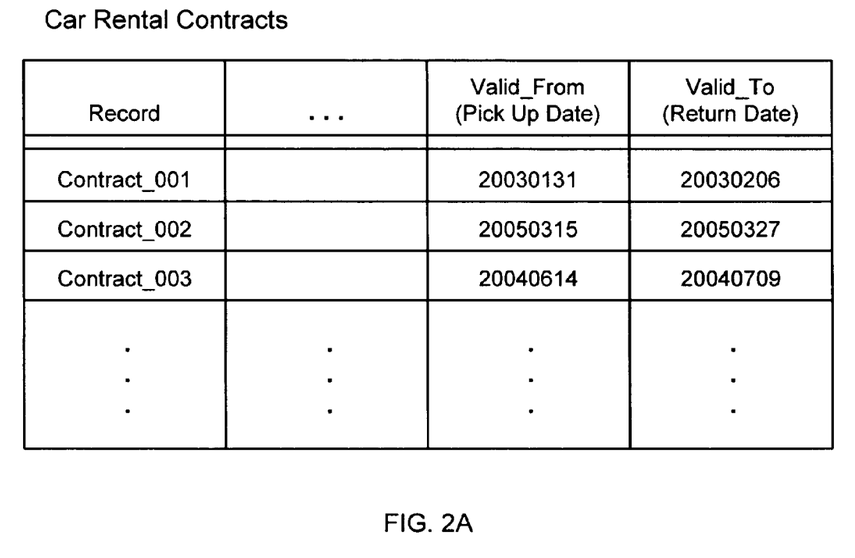
FIG. 2A is table showing an example data structure that includes a validity interval.

An example of a database of this type is shown in FIG. 2A, which shows a relational database table of car rental contracts (records) that have fields for a pick up date (that is, the "valid_from" date from which the contract is valid) and for a return date (that is, the "valid_to" date to which the contract is valid). In other words, the rental car contract is valid during an interval starting with the "valid_from" date and ending with the "valid_to" date. The FIG. 2A table shows three contracts, but of course the database may include many more. The first listed contract, "Contract_001," has a value for its "valid_from" field of "20030131," or in other words, Jan. 31, 2003, and a value for its "valid_to" field of "20030206," or Feb. 6, 2003, and thus has a validity interval spanning from Jan. 31, 2003 to Feb. 6, 2003. The convention of YYYYMMDD for the date of the "valid_from" and "valid_to" fields enables the sorting of dates chronologically, in other words, from a most significant digit to a least significant digit. The defined validity intervals of car rental contract records in the database need not be the same for every record. For example, the validity interval may be a single day or may be several days or months.

Another example database to which the techniques described in this document may relate is a database of insurance contracts with a corresponding validity period. Yet another example is a database of materials having a minimal and a maximum recommended load capacity. The latter example, where the validity interval is an interval of weight measures, illustrates that the interval need not be an interval of time, as is the case with the other previously mentioned database examples. It will be appreciated that there are many other examples of database record types that have a defined interval of some type, where a "start value" defines the start of the interval and an "end value" defines the end of the interval.

Figure 2B:
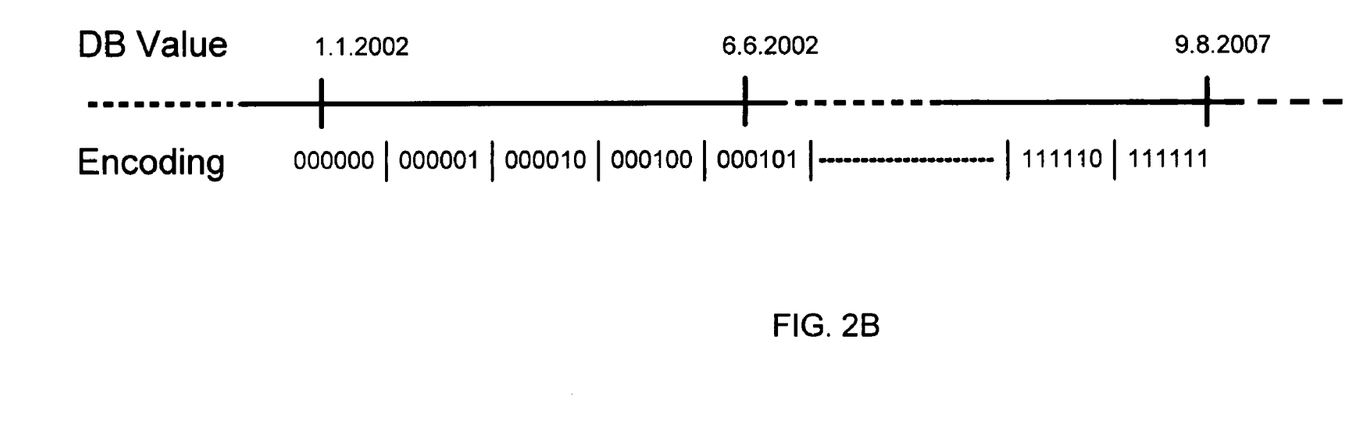
FIG. 2B is a timeline and index values defined for successive intervals over the entire timeline.

Generally, a solution to improve the performance of database records that have a defined validity interval involves a discrete encoding being stored in a database index for all but one of the database fields that define the validity interval. In the following example, a validity interval is used, which means that a query uses a ">" comparison on a "Valid from" field and a "<" comparison on a "Valid to" field. The "Valid to" field is queried discrete in this example. Suppose there is only a need to consider dates from 1.1.2002 to the start of 2007 (as is the case with the FIG. 2B example). The "Valid to" attribute is stored additionally encoded on six additional database flags. Therefore, there can be distinguished 64 intervals between 1.1.2002 to 9.8.2007, each interval being 32 days long. For any record with a "Valid from" date from 1.1.2002 to 30.1.2002, there is stored additionally 000000, from 31.1.2002 to 28.2.2002, there is stored 000001, from 1.3.2002 to 30.3.2002, there is stored 000010, etc. The last period ends at 9.8.2007. All later dates than this date are encoded 111111 as well. FIG. 2B illustrates the example. Note that all of the six independent bits can be used separately in secondary database indices.

The encoding for the "Valid to" attribute may require several database accesses when processing a query, since a discrete comparison is being considered. For example, if the "Valid to" attribute being less than or equal to 15.3.2002 is searched, then records with values 000000, 000001 and 000010 are valid. However, many of the values can be grouped, for example, 000000 and 000001 can be searched in one step by searching for 00000* (where the last bit is simply omitted). Basically, many of the values fall together. This permits having a maximum of six accesses in the above example. In most of the cases there will be significantly less (that is, one or two) accesses required depending on the threshold. This number can be further reduced by additional coding moving the threshold slightly up in the worst cases to fall into cases with fewer accesses, as will be discussed in more detail later.

The overall database response time may in any case be significantly reduced even in the worst case, because all accesses have to "touch" only those records on the index, which are in fact in the result set. This is possible by integrating both comparisons in the secondary index: the discrete "Valid to" flags are in the indices, as well as the usual "Valid from" field. This full index support for both comparisons leads to stable and significantly reduced access times. Prior art methods, for example, must scan many entries that are in fact not in the result set. This may lead to unpredictable and potentially very long runtimes. As mentioned previously, a secondary index having both "Valid to" and "Valid from" in its non-discrete form cannot be used with two comparisons operators on database in many current database systems.

Regarding the discrete encoding of database value ranges, N bits are used to encode additionally a database value of each record. Maximum and Minimal values ($Val_{max}$ and $Val_{min}$) of the database field are defined. $2^N$ intervals with equal length periods—equal to $(Val_{max}-Val_{min})/2^N$—are defined between those two limits, which are encoded ascending using the N bits. Typically, the database values do not consider fractions (e.g., integers or dates). Therefore, the limits have to be rounded up or down. An alternative is to extend $Val_{max}$ and $Val_{min}$ so that period comprises no fraction. In our example, the upper limit was chosen 9.8.2007 (instead of 1.1.2007) to get 64 intervals with 32 days each. Database values below or above the limits may get the encoding of the limits, i.e. 000 . . . 000 or 111 . . . 111. In the following the abbreviations, $bit_N$ to $bit_0$ are used for the encoding bits, where $bit_N$ is the most significant bit.

An index field may be created for each database record and used in such database search scenarios. In particular, the index field may contain a discrete encoding of one of the two fields that define the validity interval, for example, either the start field or the end field. This index field may be included, for example, in the secondary index included in the database index 160 of the FIG. 1 system 100. The index secondary index also includes, in one implementation, the non-discrete value for the start or end field that is not discrete encoded. The primary index may share fields with the secondary index, but may also be completely independent (for example, the primary index may include a contract number that is not searched).

An example encoding for the index field in the secondary index is shown in FIG. 2B. This figure shows the encoding for the start field, or "valid_from" field, of a validity time interval. In this example, it has been determined that there is only need to consider dates within a range from Jan. 1, 2000, through Aug. 9, 2005. A number of consecutive periods within this overall range are defined, and a digital value is assigned to each of the defined periods. A six-bit field, as is the case in FIG. 2B, provides 64 different digital values, and one such value may be assigned to 64 different defined periods. In that there are 64 equal-length ranges between Jan. 1, 2000, and Aug. 9 2005, each period is 32 days long in this example.

As shown in FIG. 2B, the first 32-day period is assigned a digital value of 000000, and each successively defined range thereafter has a digital value that is increased by 1. For example, the second defined range has an assigned digital value of 000001, the third defined range has an assigned digital value of 000010, and so on. The final defined range that ends at Aug. 9, 2007, has an assigned digital value of 111111. If later in the life of the database the date of Aug. 9, 2007 is passed, then all later dates beyond Aug. 9, 2007 may be encoded with 111111 also.

As shown, the date of Jun. 6, 2002 falls within the fifth defined interval. As such, a database record that is created with a validity interval having a start date of Jun. 6, 2002, is assigned a digital value of 000101, as shown in FIG. 2B.

For a database of records that have a defined validity interval, a database search scenario that may be useful is a search to identify all records having an interval that includes a single value. For example, in the FIG. 2A example, it may be desired to identify all of the car rental contracts that are valid on a particular date. A particular contract is valid on a particular date if a start date for the contract is on or before the particular date, and an end date for the contract is on or after the particular date. Another example search scenario is a search to identify all records that have an overlap, or some other kind of intersection with, a defined interval. For example, it may be desirable to search for all car rental contracts that are valid on at least one day between the period of Feb. 1 and Feb. 3, 2003. A particular contract is valid on at least one day between this specified period if a start date for the contract is on or before Feb. 3, 2003, and an end date for the contract is on or after Feb. 1, 2003.

At least one of the comparisons is executed on the encoded discrete values. In this case, the database access can be executed on a secondary index with the encoded bits and (at the end) the field with the comparison which is not encoded. For example, suppose all records valid on 9.6.2000 are to be searched. This means searching for all records with a "valid_from">=9.6.2000 and "valid_to"<=9.6.2000. As described previously, the database system is typically limited in that it may not be possible to execute both comparisons on a database index. Therefore, the "valid_to" is encoded on database as described FIG. 2A using 6 bits. The value 9.6.2002 falls into the interval encoded by 000101. Therefore, all records with an encoding from 000000 to 000101 are to be considered. These values are considered by searching for 0000* and 00010*. Two database accesses with the following WHERE clauses maybe used:

First DB Access
$bit_5$='0' and $bit_4$='0' and $bit_3$='0' and $bit_2$='0' and valid_from>='20000609'

Second DB Access
$bit_5$='0' and $bit_4$='0' and $bit_3$='0' and $bit_2$='1' and $bit_1$='0' and valid_from>='20000609'

The number of required database accesses depends on the threshold of the query. An overview for different number of encoding bits is given in the table shown in FIG. 2C. Each column of the table gives the code scheme depending on N, that is, the number of bits used for encoding. Each line gives the different bit settings to be searched on database for this interval. For example, if N=4 encoding bits are used and all records having values<=than interval 5 are requested, then two database accesses with 00* ($bit_3$='0' and $bit_2$='0') and 010* ($bit_3$='0' and $bit_2$='1' and $bit_2$='0') are required.

Figure 2C:
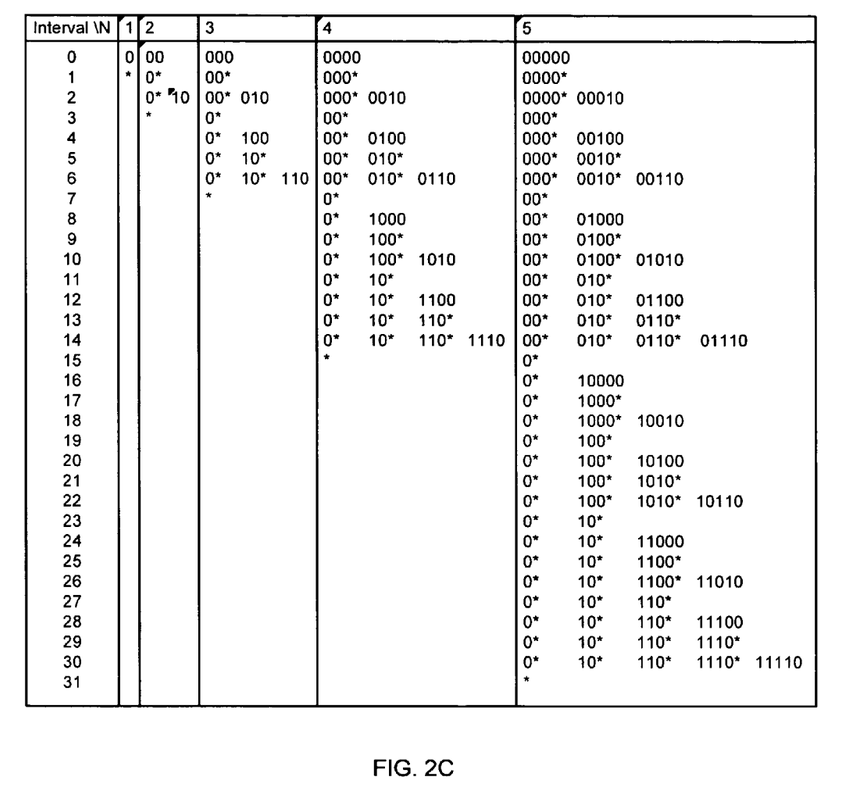
FIG. 2C is a table of example code patterns that may be used in performing the database index searching.

The table shown in FIG. 2C can be extended for a larger N by the following procedure (use the example N=2 to N=3 in the table shown in FIG. 2C as an example for the procedure):

Procedure for determining accesses for N:

Precondition: Accesses for N−1 encoding with intervals 0 to $2^{N-1}$ is determined.
  Copy entries from 0 to $2^{N-1}-2$ to the intervals 0 to $2^{N-1}-2$, add to each value a '0' in the front
  Enter 0* for interval $2^{N-1}-1$
  Copy entries from 0 to $2^{N-1}-2$ to the intervals $2^{N-1}$ to $2^{N-1}-2$, add to each value a '1' in the front; add to each entry furthermore the access 0*.
  Enter *for interval $2^N-1$
  Generally, an encoding with N bits takes a maximum of N database accesses in the worst case. The full index support as described in the next section make the access even in the worst case more efficient. Furthermore, the worst cases can be avoided by internal threshold moving as described later.

The examples above are only valid if comparisons on two different database fields are used. The approach can be used as well for comparisons on M fields. In this case, M−1 of them have to be available on the database in encoded form. For a single query, the different bit settings for each of the M−1 fields is determined according to the table shown in FIG. 2C. The combination of all the different bit settings results in the final number of the database accesses to be executed. This might run into combinatorial problems. However, applications requiring more comparisons on more than two database fields are expected to be rare.

Secondary indices for any of the database accesses described in the preceding section may be activated to support full database index support. In the following, only the typical use case for a comparison on two different database fields is discussed. The example of valid_to and valid_from with six-bit encoding is used as described in the previous section.

Secondary indices with the following database fields (in this order) are required:
  $bit_5$ $bit_4$ $bit_3$ $bit_2$ $bit_1$ $bit_0$ valid_from
  $bit_5$ $bit_4$ $bit_3$ $bit_2$ $bit_1$ valid_from
  $bit_5$ $bit_4$ $bit_3$ $bit_2$ valid_from
  $bit_5$ $bit_4$ $bit_3$ valid_from
  $bit_5$ $bit_4$ valid_from
  $bit_5$ valid_from This means that for N encoding bits, N secondary indices are required.

The number of database accesses in the worst case as indicated by the table in FIG. 2C can be further reduced by additional coding moving the threshold slightly up in the worst cases to fall into cases with fewer accesses. For example, if N=5 and all records with a value in interval 14 are searched, then four database accesses (00*, 010*, 0110, 01110) are required. By moving up the threshold to 15, only one is necessary (0*). The advantage of automatic threshold increasing is that threshold requiring many database accesses can be avoided. On the other hand, some false hits (lying between the real threshold and the used threshold) are unnecessarily scanned on the index. In this example, the records lying exactly in interval 15 have to be filtered later on.

Figure 3A:
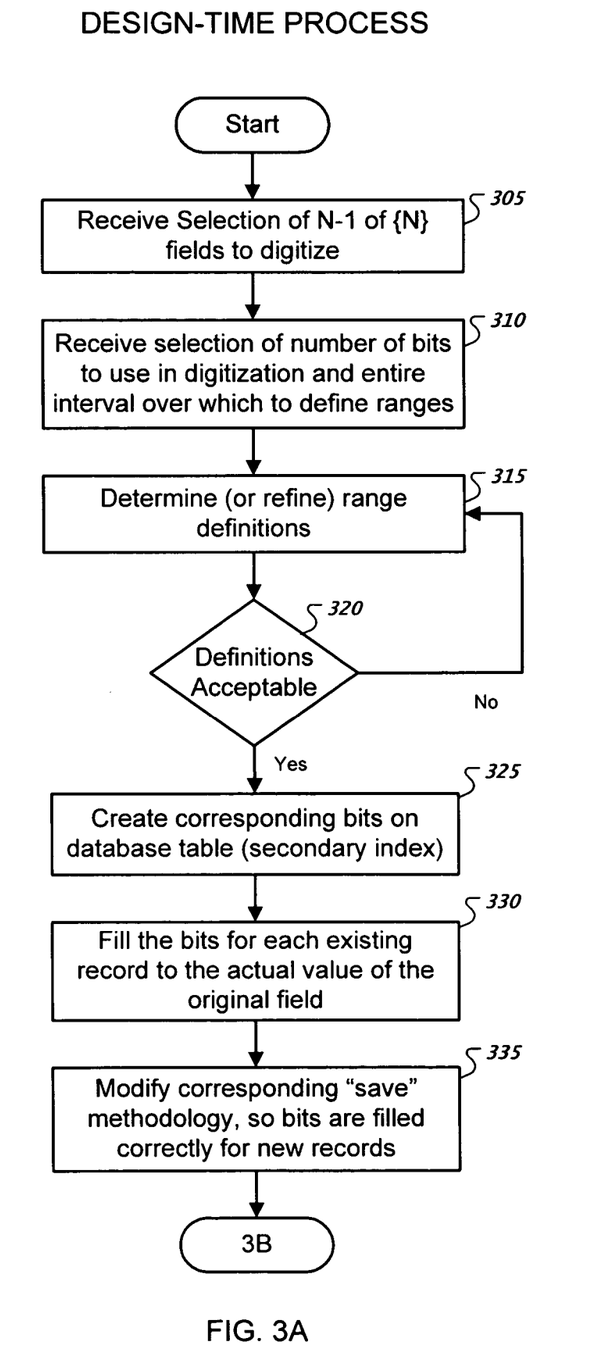
FIGS. 3A-3B are flow charts showing a design-time method for creating an index for database searching of records having validity intervals.
Figure 3B:
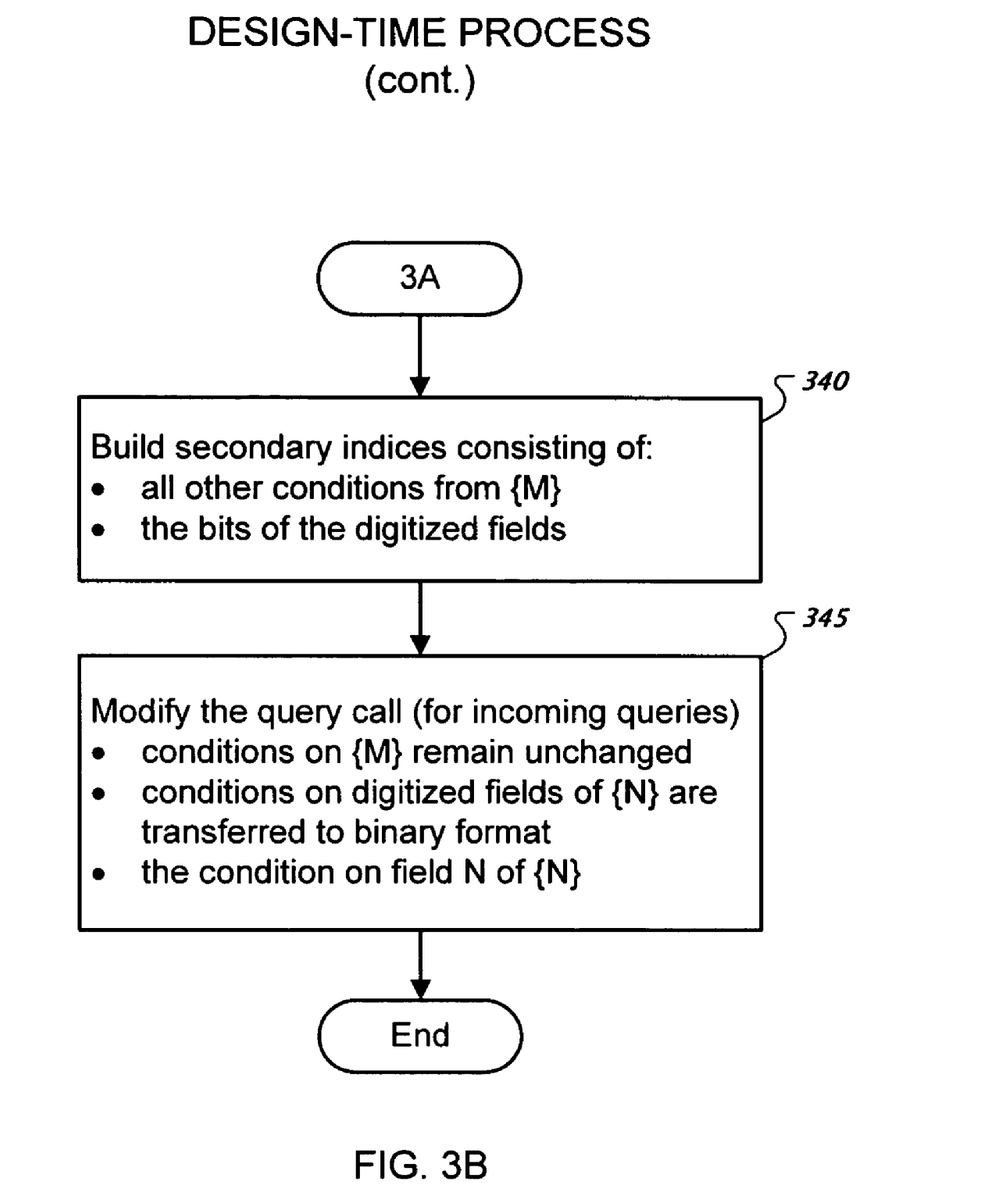

Referring to FIGS. 3A and 3B, a flowchart shown on these figures shows a method that may be executed during a design of the database to include an index field, such as the index field illustrated in FIG. 2B. The method shown in FIGS. 3A and 3B may be executed, for example, by processors residing in the server system 120, for example, in the application program module 140B and/or the database management system 150. In an example situation to which the method of FIGS. 3A and 3B is applied, there are anywhere from 2 to N (that is, 2 ... N) fields {N}, on which an inequality function (for example, less than, greater than, less than or equal to, and greater than or equal to) condition should be executed for a search function, and which in many cases restrict the result significantly only in conjunction (that is, only when both conditions are applied and both are met). There are anywhere from 0 to M other conditions {M}, which use either other comparison operators, such as an equality function, or are conditions that do not restrict the result set significantly when used alone.

The method begins, at step 305, with a user choosing N−1 fields from {N} to digitize. This choice is received by the system. In the example of database records with a validity interval defined by a start field and an end field, there would be two fields, and one of the fields would be digitized (encoded). Either the start field or the end field may be selected to be digitized, for example. The selection of the fields to digitize may be made by a user interacting with a client computer device, and entering a selection of the field to digitize. Next, at step 310, a selection is received of the number of bits to use in the digitization, and an entire interval over which to define multiple consecutive ranges. Referring to the example index scheme shown in FIG. 2B, six (6) bits were selected to be used in the digitization, and a period from Jan. 1, 2002 to Sep. 8, 2007 is digitized.

Referring next to step 315, a determination is made as to the definition of each successive range within he entire interval. While this step is shown being performed automatically by the system, in most cases the definitions will be made manually by a designer. Referring again to FIG. 2B for illustration purposes, it may be determined that ranges of equal size (32 days) over the entire interval may be defined. For example, if N bits are used to encode, and maximum and minimum values ($Val_{max}$ and $Val_{min}$) for the entire interval are defined, then $2^N$ intervals with equal length may be defined between those two limits, with each successive interval being encoded ascending using the N bits. In this case the equal length periods would equal Period=$(Val_{max}-Val_{min})/2^N$. Typically, the database values would not consider fractions, but rather would only consider integers or dates, for example. Therefore, the limits may need to be rounded up or down. An alternative is to extend $Val_{max}$ and $Val_{min}$ so that the period comprises no fraction. In the example of FIG. 2B, the upper limit was chosen to be Aug. 9, 2005, which yields 64 intervals of 32 days each.

Alternatively, the ranges may have different lengths, which may be useful, for example, if the records with validity ranges for particular ranges within the entire range may be more prevalent than records with validity ranges that are elsewhere within the entire range. In these cases, the period over which records are more prevalent may have smaller defined ranges.

The initial determination of the range definitions at step 315 may be performed automatically, without user intervention, from simply the information received in step 310 and some predefined algorithm to define ranges based on this information (such as an algorithm that creates equal-length consecutive ranges over the entire interval). At step 320, it is determined whether the definitions of the ranges are acceptable. This may be done by presenting to a user the defined ranges that are determined automatically, and receiving a user input as to whether or not the defined ranges are acceptable. If not, the processing proceeds back to step 315, where user input may be received to alter, or refine, the range definitions.

Once it is determined at step 320 that the definitions of the ranges are acceptable, processing proceeds to step 325, where there is created corresponding bits for each range that is defined. For example, a database table may include the defined index value (bits) for each of the defined, successive ranges. For example, in FIG. 2B the first range may be for the period include January 1 through Feb. 1, 2000, and any record with a start or end field (depending on which was digitized) that falls in that period would be given an index of 000000. The ranges and corresponding indexes may be tabulated in a database table.

Next, at step 330, for cases where records already exist but have not yet been indexed, the bits are filled for each existing database record. This index information may be provided, for example in the FIG. 1 example, in the secondary index that is included in the database indices repository 160. Referring again to FIG. 2B to illustrate step 325, a particular record with a database value of Jun. 6, 2000, for a start field for example, may be given an index value of 000101. The secondary index would then include, for example, an index value and an associated record for each of the records included in the database 130. Next, in step 335, a corresponding database record "save" methodology may be modified, so that bits are filled correctly for new records as they are created. This may involve simply comparing the start or end field (as the case may be) to the database table of ranges and associated digitized indexes for the ranges, and determining from the table the correct indexing for the record.

Continuing with the design-time method to FIG. 3B, the secondary indices are then built, at step 340. This would be done, in this example, automatically by the database upon modification of the record. In the example shown in FIG. 3B, the secondary indices would first include all other conditions from {M} that may not restrict the result set significantly. In addition, the secondary indices would also consist of the bits of the digitized (encoded) fields. An example of how this is done was provided in FIG. 2C and accompanying discussion.

Next, at step 345, the database query call is modified, so that it will be applied to incoming queries. In this example, conditions on {M} remain unchanged. Conditions on digitized fields are transferred into binary format. The combinations (including omitting bits which may be one or zero) that describe the ranges to be covered are determined. Furthermore, the conditions on the original fields remain unchanged if a bit combination can describe multiple values of the original field (e.g., 0010 may describe Mar. 1, 2003 to Apr. 1, 2003). Again, further information on this was provided in connection with FIG. 2C. The condition on the field of {N} that is not digitized remains unchanged.

Figure 4:
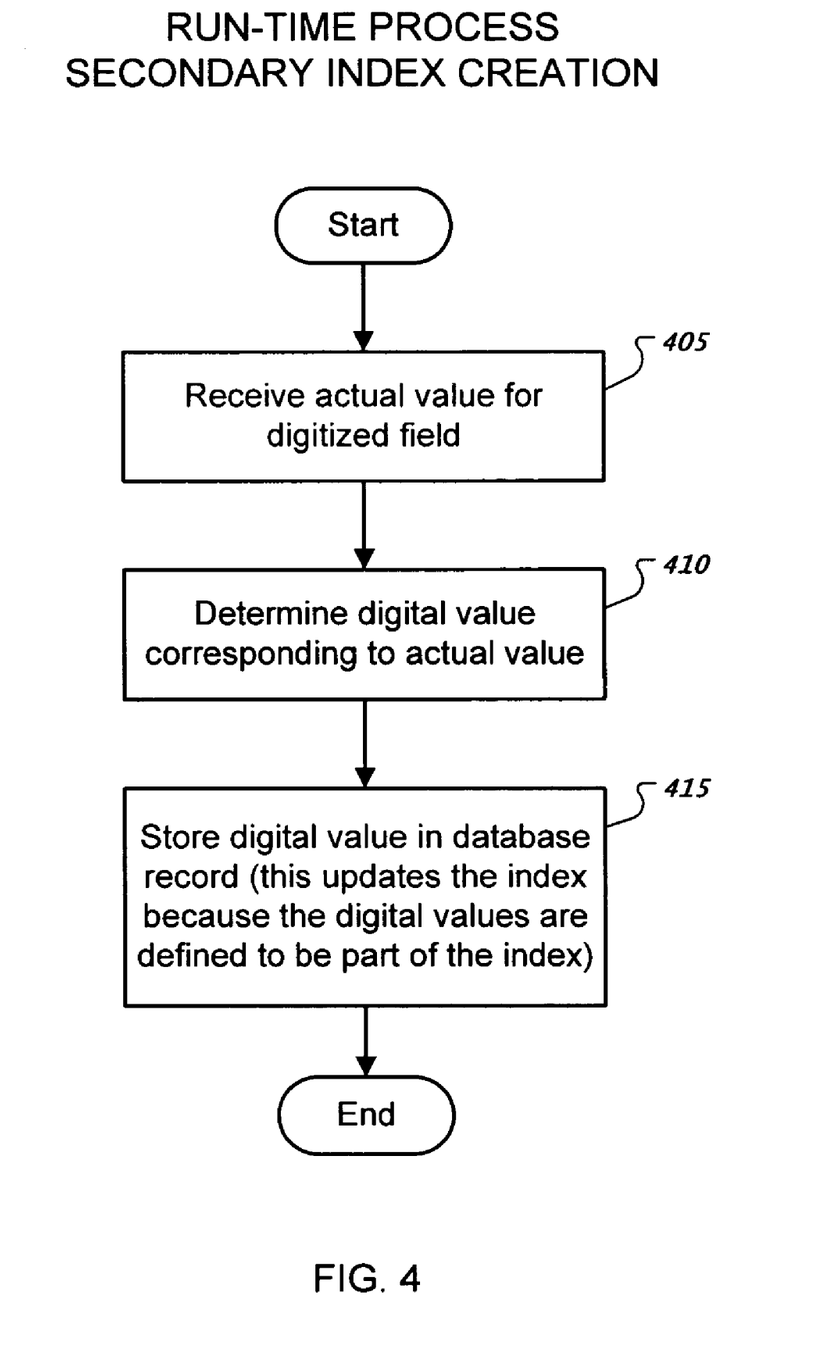
FIGS. 4-5 are flow charts showing a run-time method for creating an index for database records, and for performing a search for records whose validity interval meets a specified condition, the search using an index of the type created using a process shown in FIGS. 3A-3B.

Referring now to the procedure at run time, FIG. 4 first shows a method that may be executed during the time of saving a database record. At step 405, the system receives an actual value for a digitized field. In the rental car contract example described previously, this may be when an agent enters into the system when the car will be returned, or makes a change in the system as to when the car will be returned. Next, at step 410, the system determines the digital value corresponding to the actual value, and at step 415, the digital value is stored in connection with the database record. This also automatically updates the index, because the digital values are defined to be part of the index.

Figure 5:
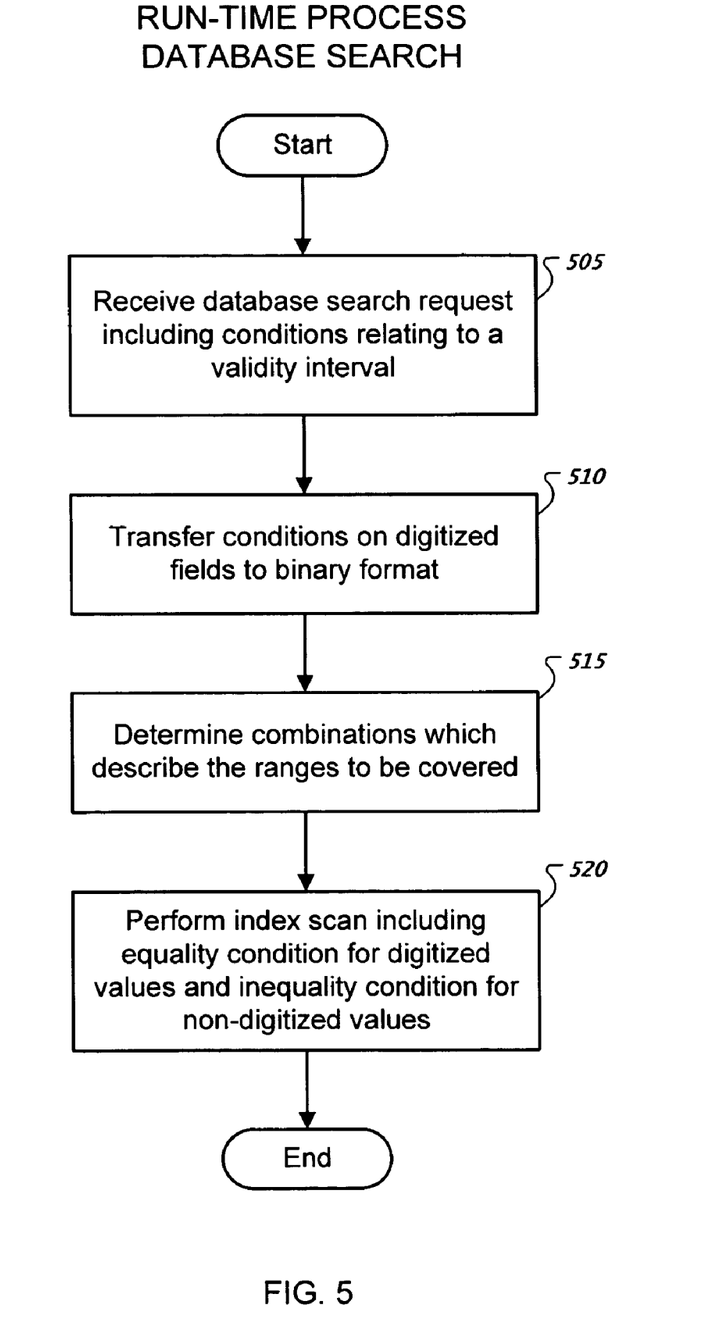

FIG. 5 shows a method executed at run time when a search of the database is performed. First, at step 505, the system receives a database search request that includes conditions relating to a validity interval. For example, this may be a user entering a search to retrieve all rental car contracts that are valid on a certain date, and the validity period has a start date and an end date, one of which is digitized as described previously. The conditions on digitized fields are transferred to the binary format, at step 510. At 515, the combinations (including omitting bits that can be one or zero) which describe the ranges to be covered are determined; furthermore, the conditions on the original fields remain unchanged, if a bit combination can describe multiple values of the original field (e.g., 0010 may describe Mar. 1, 2003 to Apr. 1, 2003). At step 520, an index scan is performed using an equality condition for the encoded index values representing the one of the start and end attributes that was encoded, and using an inequality condition on the other of the start and end attributes what was not encoded. This will return a results lists that in many cases will be much smaller than if only the inequality condition were used. Next, if necessary, another scan may be performed on the result set using the inequality condition on the attribute values for which the equality condition was used in the prior scan. This filters from the result set the records for those cases where the conditions do not align with the boundaries for the defined periods within the range.

Figure 6:
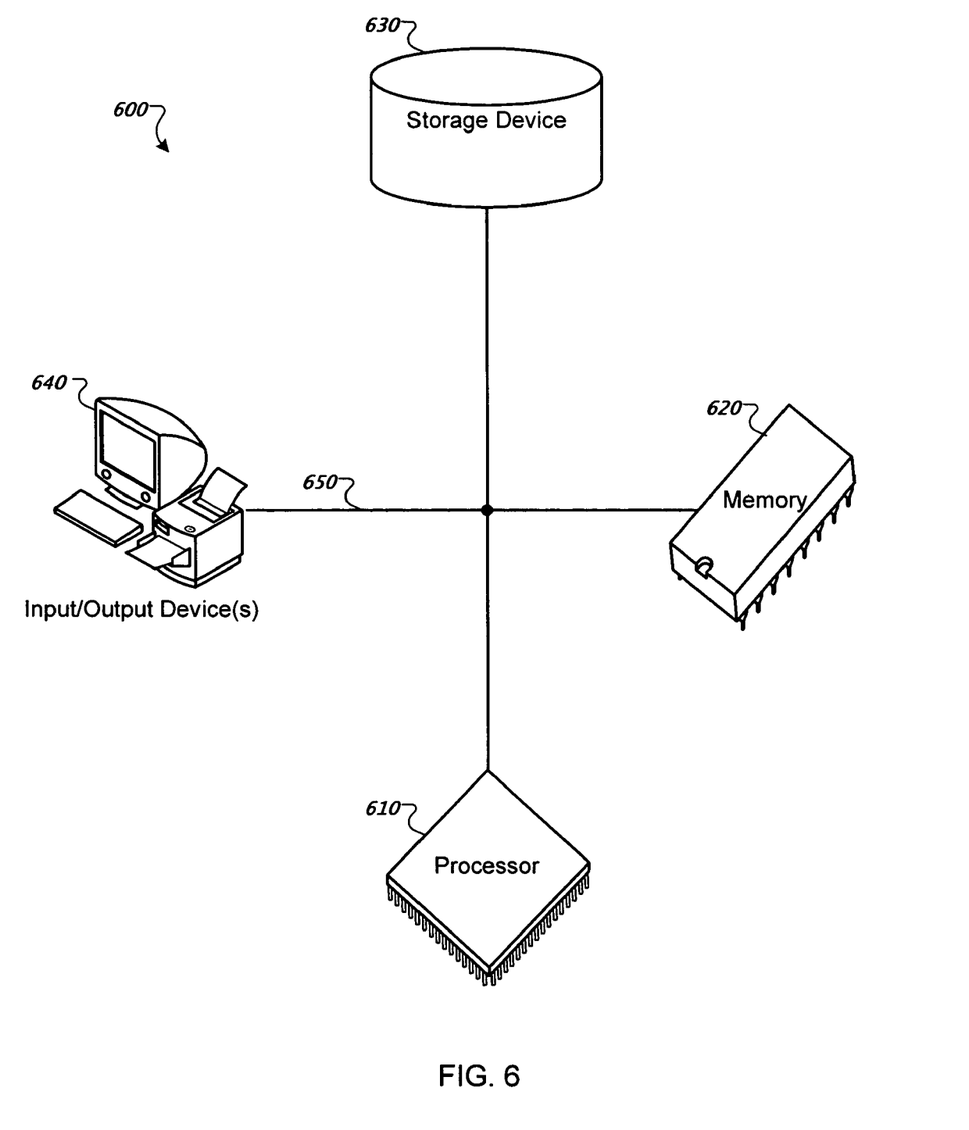
FIG. 6 is a diagram of a computing system that may execute operations to perform computer-implemented methods.

FIG. 6 is a schematic diagram of a generic computer system 600. The system 600 can be used for the operations described in association with the computer-implemented methods described above according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium, and in another, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Also, the logic flows depicted in the figures do not require the particular order shown, or sequential order, to achieve desirable results. Also, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of performing an electronic database search, the method comprising:
receiving a request to identify database records in a database that satisfy a specified condition, the records being of a type that has, for a time property, a defined validity range bounded by a value for a first attribute and a value for a second attribute, wherein the specified condition is of a type that is satisfied for a record when for a record both a first inequality condition on the first attribute value and a second inequality condition on the second attribute value are satisfied, the database permitting only one inequality condition in a scan of an index of the database;
executing a first scan of the index for the database records, the index including, for each of the records, the first attribute value for the record and an encoded value of the second attribute value for the record, the encoded value being one of multiple unique digital values for each of multiple consecutive ranges for the property within which the second attribute falls, each different unique digital value defined for each of the multiple defined consecutive ranges being a different binary code, each of the ranges comprising at least two values, the first scan identifying records for which both the inequality condition on the first attribute value and an equality condition on the encoded value for the second attribute value are satisfied;
executing a second scan of the index of the records, the second scan identifying, from among the records identified in the first scan using the inequality condition on the first attribute values and the equality condition on the encoded values for the second attribute values, records for which the inequality condition on the unencoded second attribute values is also satisfied, the equality condition on the encoded value for the second attribute filtering all records for which no value within the range corresponding to the encoded value would satisfy the inequality condition on the second attribute; and returning data characterizing the records identified in the second scan.

2. The method of claim 1, wherein the property is a property that has a continuum of possible values.

3. The method of claim 1, wherein the second attribute is a start value field of database records, and the equality condition is a condition wherein the encoded value for the second attribute value for a record equals either the digital value corresponding to the latest of the ranges for the property wherein the specified condition is satisfied or the digital value corresponding to any earlier ones of the ranges.

4. The method of claim 3, wherein the first attribute is an end value field, and the inequality condition is a condition wherein the value for the end value field for a record is before a value for the property that permits the specified condition to possibly be met.

5. The method of claim 1, wherein the second attribute is an end value field of database records, and the equality condition is a condition wherein the encoded value for the second attribute value for a record equals either the digital value corresponding to the earliest of the ranges for the property wherein the specified condition is satisfied or the digital value corresponding to any earlier ones of the ranges.

6. The method of claim 5, wherein the first attribute is a start value field, and the inequality condition is a condition wherein the value for the start value field for a record is after a value for the property that permits the specified condition to possibly be met.

7. A computer program product tangibly embodied in a storage medium comprising program instructions that when executed perform a method of performing an electronic database search, wherein the method comprises:

receiving a request to identify database records in a database that satisfy a specified condition, the records being of a type that has, for a time property, a defined validity range bounded by a value for a first attribute and a value for a second attribute, wherein the specified condition is of a type that is satisfied for a record when for a record both a first inequality condition on the first attribute value and a second inequality condition on the second attribute value are satisfied, the database permitting only one inequality condition in a scan of an index of the database;

executing a first scan of the index for the database records, the index including, for each of the records, the first attribute value for the record and an encoded value of the second attribute value for the record, the encoded value being one of multiple unique digital values for each of multiple consecutive ranges for the property within which the second attribute falls, each different unique digital value defined for each of the multiple defined consecutive ranges being a different binary code, each of the ranges comprising at least two values, the first scan identifying records for which both the inequality condition on the first attribute value and an equality condition on the encoded value for the second attribute value are satisfied;

executing a second scan of the index of the records, the second scan identifying, from among the records identified in the first scan using the inequality condition on the first attribute values and the equality condition on the encoded values for the second attribute values, records for which the inequality condition on the unencoded second attribute values is also satisfied, the equality condition on the encoded value for the second attribute filtering all records for which no value within the range corresponding to the encoded value would satisfy the inequality condition on the second attribute; and returning data characterizing the records identified in the second scan.

8. The computer program product of claim 7, wherein the property is a property that has a continuum of possible values.

9. The computer program product of claim 7, wherein the second attribute is a start value field of database records, and the equality condition is a condition wherein the encoded value for the second attribute value for a record equals either the digital value corresponding to the latest of the ranges for the property wherein the specified condition is satisfied or the digital value corresponding to any earlier ones of the ranges.

10. The computer program product of claim 9, wherein the first attribute is an end value field, and the inequality condition is a condition wherein the value for the end value field for a record is before a value for the property that permits the specified condition to possibly be met.

11. The computer program product of claim 7, wherein the second attribute is an end value field of database records, and the equality condition is a condition wherein the encoded value for the second attribute value for a record equals either the digital value corresponding to the earliest of the ranges for the property wherein the specified condition is satisfied or the digital value corresponding to any earlier ones of the ranges.

12. The computer program product of claim 11, wherein the first attribute is a start value field, and the inequality condition is a condition wherein the value for the start value field for a record is after a value for the property that permits the specified condition to possibly be met.

13. A computing system performing an electronic database search, the system comprising:

memory; and one or more processors that perform operations comprising:

receiving a request to identify database records in a database that satisfy a specified condition, the records being of a type that has, for a time property, a defined validity range bounded by a value for a first attribute and a value for a second attribute, wherein the specified condition is of a type that is satisfied for a record when for a record both a first inequality, condition on the first attribute value and a second inequality condition on the second attribute value are satisfied, the database permitting only one inequality condition in a scan of an index of the database;

executing a first scan of the index for the database records, the index including, for each of the records, the first attribute value for the record and an encoded value of the second attribute value for the record, the encoded value being one of multiple unique digital values for each of multiple consecutive ranges for the property within which the second attribute falls, each different unique digital value defined for each of the multiple defined consecutive ranges being a different binary code, each of the ranges comprising at least two values, the first scan identifying records for which both the inequality condition on the first attribute value and an equality condition on the encoded value for the second attribute value are satisfied;

executing a second scan of the index of the records, the second scan identifying, from among the records identified in the first scan using the inequality condition on the first attribute values and the equality condition on the encoded values for the second attribute values, records for which the inequality condition on the unencoded second attribute values is also satisfied, the equality condition on the encoded value for the second attribute filtering all records for which no value within the range corresponding to the encoded value would satisfy the inequality condition on the second attribute; and returning data characterizing the records identified in the second scan.

14. The system of claim 13, wherein the property is a property that has a continuum of possible values.

15. The system of claim 13, wherein the second attribute is a start value field of database records, and the equality condition is a condition wherein the encoded value for the second attribute value for a record equals either the digital value corresponding to the latest of the ranges for the property wherein the specified condition is satisfied or the digital value corresponding to any earlier ones of the ranges.

16. The system of claim 15, wherein the first attribute is an end value field, and the inequality condition is a condition wherein the value for the end value field for a record is before a value for the property that permits the specified condition to possibly be met.

17. The system of claim 15, wherein the second attribute is an end value field of database records, and the equality condition is a condition wherein the encoded value for the second attribute value for a record equals either the digital value corresponding to the earliest of the ranges for the property wherein the specified condition is satisfied or the digital value corresponding to any earlier ones of the ranges.

18. The system of claim 17, wherein the first attribute is a start value field, and the inequality condition is a condition wherein the value for the start value field for a record is after a value for the property that permits the specified condition to possibly be met.

* * * * *